United States Patent [19]
Leman et al.

[11] Patent Number: 5,436,792
[45] Date of Patent: Jul. 25, 1995

[54] PIVOTABLE DOCKING STATION FOR USE WITH NOTEPAD COMPUTER SYSTEMS

[75] Inventors: Michael V. Leman, Spring; Michael E. Taylor, Magnolia, both of Tex.

[73] Assignee: Compaq Computer Corporation, Houston, Tex.

[21] Appl. No.: 119,745

[22] Filed: Sep. 10, 1993

[51] Int. Cl.⁶ .................... G06F 1/16; H05K 7/16; E05D 11/10; F16C 11/10
[52] U.S. Cl. ................... 361/686; 361/755; 16/326; 16/329; 16/342; 74/530; 403/93; 403/94
[58] Field of Search ............... 364/708.1; 16/324, 326, 16/329, 330, 334, 341, 342; 74/530; 403/93, 94, 97, 106; 312/223.1, 223.2; 361/679–686, 724–727, 730, 825, 752, 755, 796, 829

[56] References Cited
U.S. PATENT DOCUMENTS

| | | |
|---|---|---|
| 4,089,464 | 5/1978 | Teti, Jr. et al. . |
| 4,196,821 | 4/1980 | Teti, Jr. et al. ............ 16/330 X |
| 4,773,783 | 9/1988 | Dickie . |
| 4,903,222 | 2/1990 | Carter et al. . |
| 4,969,830 | 11/1990 | Daly et al. ................ 361/686 X |
| 5,100,098 | 3/1992 | Hawkins ................ 361/683 X |
| 5,199,888 | 4/1993 | Condra et al. . |

FOREIGN PATENT DOCUMENTS
WO91/09363 6/1991 WIPO .

OTHER PUBLICATIONS

Barr & Newbarth, *Pen Pals*, PC Magazine, vol. 12, No. 17, Oct. 12, 1993 (cover page, pp. 116–120, 134, 136, 138, 143–145, 148, 157–158, 163, 166–167, 170, 172, 174, 176, 178–179, 182–25 pgs. total).
Dan Mezick, *Pen Computing Catches On*, Byte Magazine, Oct. 1993 (pp. 105–106, 108, 110–112–6 pgs. total).
Tom Halfhill, *PDAs Arrive*, Byte, Oct. 1993 (pp. 66–69, 72, 74, 76, 78, 80–82, 84, 86–13 pgs. total).
Rob Beattie, *Year of the Pen?*, PC User Magazine, Jan. 13, 1993 (pp. 1–9; Illustration shown in PC Week, Nov. 16, 1992, p. 17) (10 pgs total).
Herb Bethoney, *Newton MessagePad PDA Follows Through On Prerelease Promises*, PC Week, vol. 10, No. 30, Aug. 2, 1993 (cover page, pp. 20–21–3 pgs. total).
Cortesea and Zimmerman, *Compaq Driving Pen Convertible Into Notebook Market*, PC Week, vol. 10, No. 21, May 31, 1993 (cover page, pp. 11–2 pgs. total).
Michael P. Zimmerman, *Detachable Screen turns ZDS Notebook Into Pen PC*, PC Week, Jun. 14, 1993 (p. 17–1 pg. total).
Erica Schroeder, *Eo to Stress Comm Functions in PDA*, PC Week, Nov. 9, 1992 (p. 24–1 pg. total).
Michael R. Zimmerman, *IBM, NCR Preview New Pen Products, Expo Also Features First Color Pen PC*, PC Week, Sep. 28, 1992 (pp. 25–26–2 pgs. total).
Neal Boudette, *Hi-Tech To Offer Pen Computer From Hitachi*, PC Week, Aug. 24, 1992 (pp. 19, 23–2 pgs. total).
Michael R. Zimmerman, *Show Attendees Get Look at DEC's Future*, PC Week, May 11, 1992 (p. 12–1 pg. total).

*Primary Examiner*—Michael W. Phillips
*Attorney, Agent, or Firm*—Pravel, Hewitt, Kimball & Krieger

[57] ABSTRACT

A docking station for use with a notepad computer is disclosed. The main electronic housing of the docking station is pivotably mounted with a receiving tray to provide a number of positions for the notepad computer between an upright position and a low angle position. The more upright positions are useful when using the internal display of the notepad computer, particularly if an external keyboard and pointing device are used. The low angle position is useful when an external monitor is used and the overlay of the notepad computer is used for input. The receiving tray is removably mounted to the docking station and may be replaced with another receiving tray of a different size for use with a different notepad computer of a different size.

20 Claims, 5 Drawing Sheets

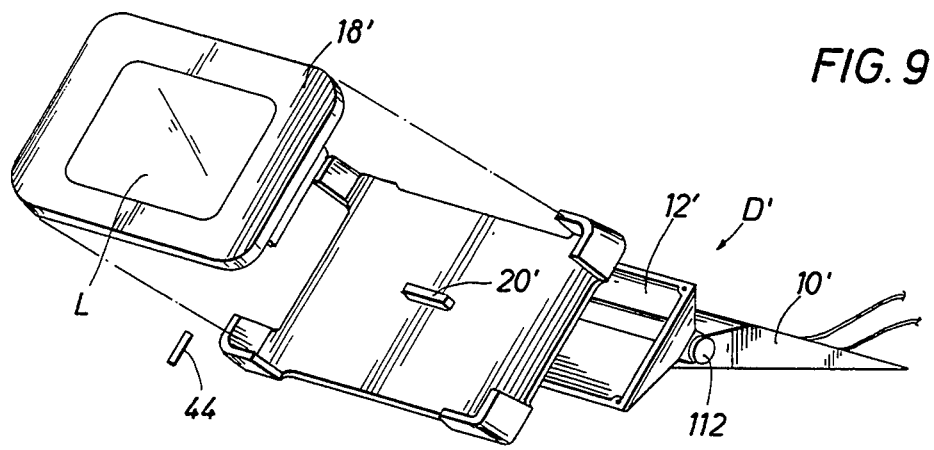
FIG. 9
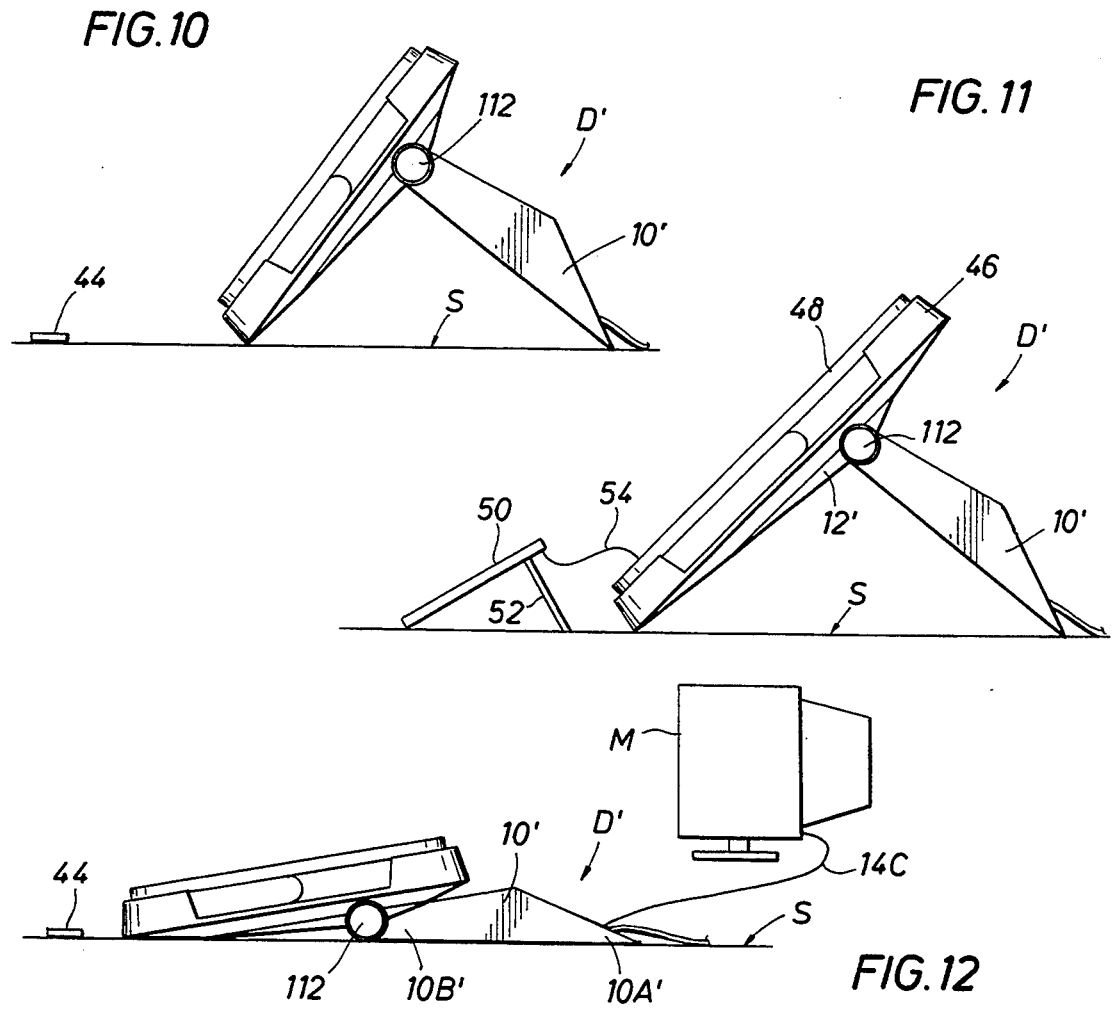
FIG. 10
FIG. 11
FIG. 12

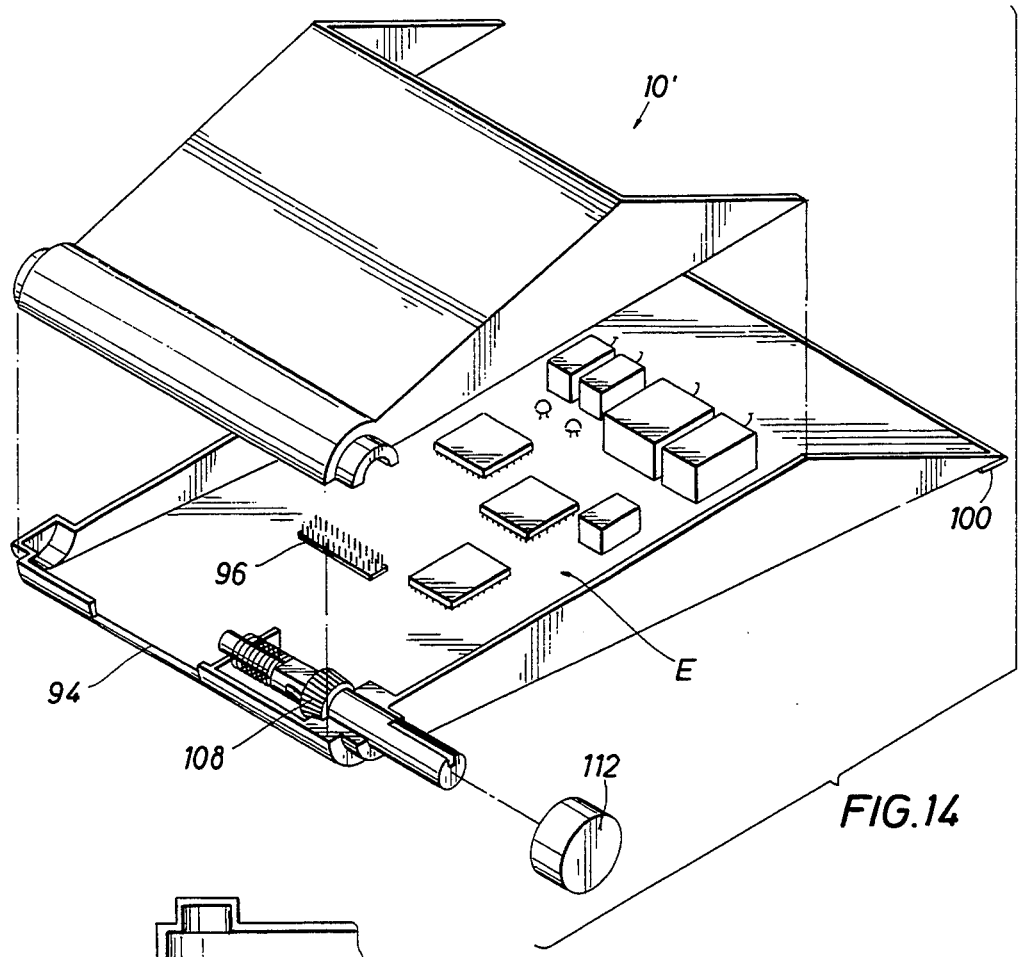
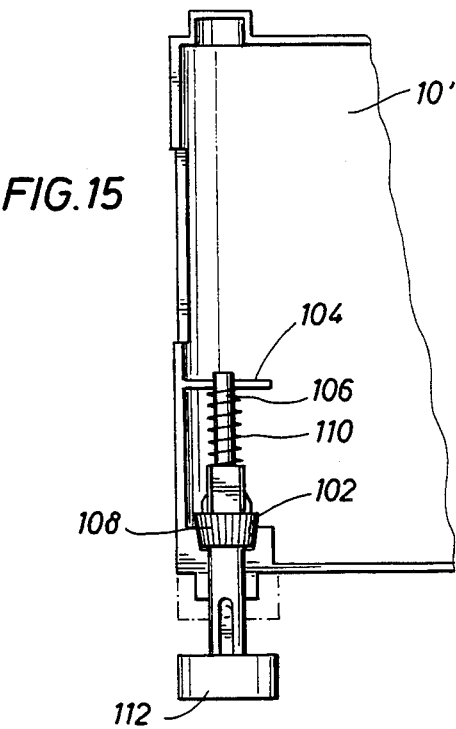
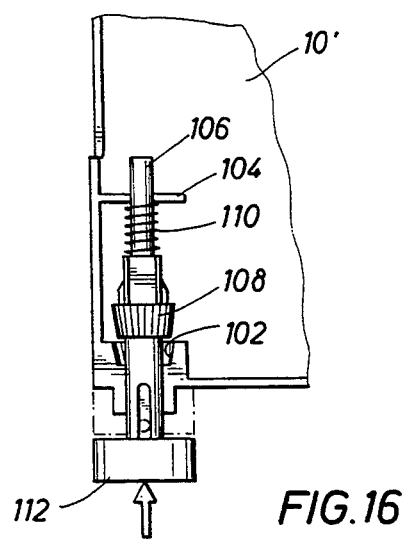

PIVOTABLE DOCKING STATION FOR USE WITH NOTEPAD COMPUTER SYSTEMS

BACKGROUND OF THE INVENTION

The invention relates to portable computer systems, and particularly to a docking station for use with a notepad computer that provides ease of connection and pivotable positioning for viewing the display of the notepad computer.

DESCRIPTION OF THE RELATED ART

Portable computer systems are becoming more powerful, smaller and lighter with each few months.

Notebook computers have been available for some time. They are generally approximately $8\frac{1}{2}'' \times 11''$ in width and length and $1\frac{1}{2}''$–$2''$ thick. An example of a conventional notebook computer is disclosed in U.S. Pat. No. 4,903,222.

A more recent arrival in the class of portable computers is the slate or notepad computer. In this type of computer, a stylus may be used to write directly on the LCD screen used in the unit. An underlay captures the movement of the stylus and software in the computer converts the movement to commands, either by monitoring location when the computer is being used in a touch screen-like mode, or by converting the movements into specific characters, which then forms the command or data.

The notepad computer generally includes a printed circuit board (PCB), hard drive, battery, power supply (DC to DC), memory, modem/DAA and an optional floppy drive that can be used with PCMCIA slots in the notepad computer. The notepad computer could also include an optional keyboard.

One device which has been present for sometime for use with laptop and notebook computers is a docking station to provide expansion capabilities and easier connection/disconnection of external devices such as CRTs and larger external keyboards. Examples of docking stations or expansion bases are disclosed in U.S. Pat. Nos. 4,903,222 and 5,199,888 that are assigned to the same assignee of the present invention and are incorporated herein by reference for all purposes. The docking station or expansion base includes connectors for receiving a CRT cable, a parallel printer cable, a keyboard cable, a serial port cable and certain expansion capabilities. The laptop or notebook computer includes a single expansion base connector to mate with a connector in the docking station to directly connect the notebook computer to the docking station. This is more convenient than requiring the user to remove and install a plurality of cables each time the computer is removed and returned. However, the conventional docking stations have been fixed items, receiving the laptop or notebook computer in a sliding horizontal fashion.

In notebook computers, such as disclosed in U.S. Pat. No. 4,903,222, the keyboard connected with the notebook computer is the data entry device and the desired typing position is approximately horizontal. Further, the display internal with the notebook computer is hinged from the notebook computer, so the internal display can be readily used, if desired, with the notebook computer in the horizontal position in the docking station.

However, this conventional docking station arrangement for the notebook computer is unacceptable for use with notepad computers. Since, the display of the notepad computer is not separately hinged, horizontal positioning of the notepad computer creates problems because the display can only be viewed from above and not at an angle. Thus a conventional notebook docking station configuration is not acceptable for use with a notepad computer. Yet the desire for easy connection with external devices and resulting peripheral ports remains, so a configuration which allows the easy connection and disconnection and yet allows for positioning of the notepad display at an angle for visibility while seated is needed. It is further desirable that the docking station allow the notepad computer to pivot to a more convenient writing position if an external monitor is used.

SUMMARY OF THE INVENTION

A docking station for use with a notepad computer includes a main electronic housing having a front pivot portion and a rear portion. A receiving tray is pivotably connected to the front pivot portion for receiving the notepad computer. A circuit board located in the main housing includes a plurality of connectors for receiving power cables and cables from various peripheral devices, with the connectors accessible from the rear and side portion of the main housing. A cable extends from the main housing to a connector in the receiving tray. The connector mates with an expansion connector in the notepad computer.

The main housing is pivotably mounted with the receiving tray to receive the notepad computer to provide a number of positions for the notepad computer between an upright position and a low angle position. The upright positions are useful when using the internal display of the notepad computer, particularly if an external keyboard or pointing device are used. The low angle position is useful when an external monitor is used and the overlay of the notepad computer is used for input.

BRIEF DESCRIPTION OF THE DRAWINGS

The objects, advantages and features of the invention will become more apparent by reference to the drawings which are appended hereto wherein like numerals indicate like parts and wherein an illustrated embodiment of the invention is shown of which:

FIG. 9 a perspective exploded view of an alternative embodiment of the docking station with a notepad computer shown removed from its receiving tray;

FIG. 10 is a side view of the notepad computer received in the docking station of FIG. 9 showing the front pivot portion of the main housing spaced apart from the supporting surface and the rear portion engaging the supporting surface;

FIG. 11 is a view similar to FIG. 10 with the same base member and main housing but with a keyboard, a larger receiving tray and notepad computer;

FIG. 12 is a side view of the notepad computer and the docking station with the front pivot portion and the rear portion of the main housing engaging the supporting surface along with an external monitor;

FIG. 14 is an enlarged exploded view of the main housing of FIG. 9;

FIG. 15 is a plan view of an alternative embodiment of the control means in the engaged position; and FIG. 16 is a view similar to FIG. 15 with the control means in the disengaged position.

DETAILED DESCRIPTION OF THE PREFERRED EMBODIMENT

Figure 1:
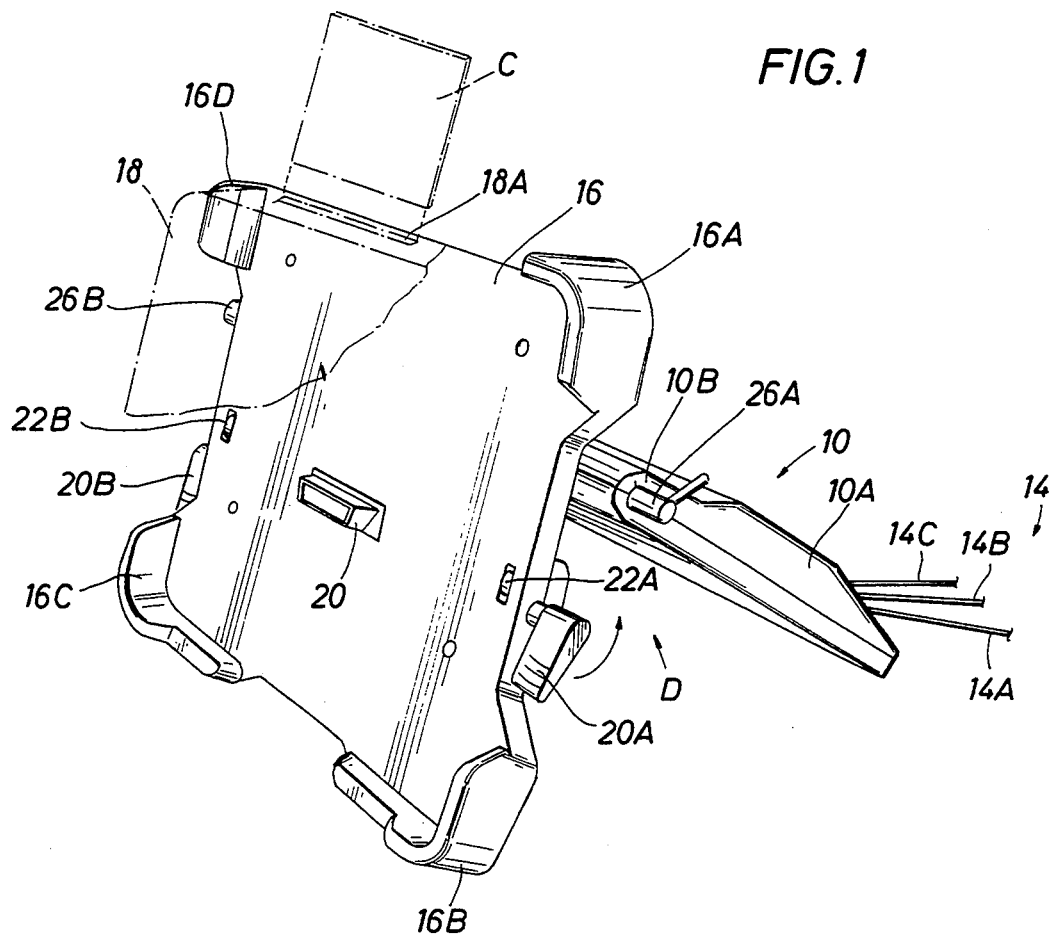
FIG. 1 is a perspective view of the preferred embodiment of the docking station showing the notepad computer having a PCMCIA slot and PCMCIA card in phantom view.
Figure 2:
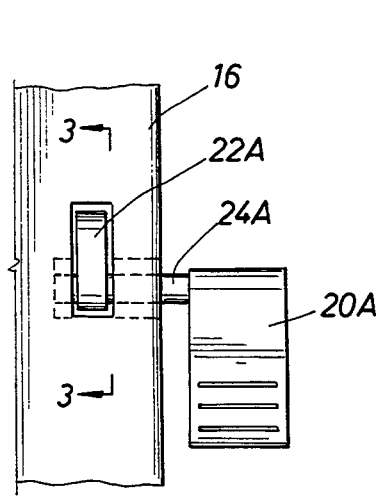
FIG. 2 is an enlarged section view of the ejection lever and cam of the receiving tray as shown in FIG. 1.

Referring to FIGS. 1-16, a docking station, generally indicated at D for the preferred embodiment or D' for the alternative embodiment, for use with a notepad computer 18 is provided. The main electronic housing 10 and base member 12 of the docking station D can be used with different size receiving trays to receive corresponding sizes of notepad computers, as will be discussed in detail below.

Turning now to FIGS. 1 and 5-7, a notepad computer 18 is received for use with the docking station D. The main electronic housing 10 has a rear portion 10A and a front pivot portion 10B. A number of cables 14 extend from the rear portion 10A of the main housing 10. For example, these cables include a power cable 14A, and can include other cables used with the system depending on selected options, such as a keyboard cable 14B, a mouse cable, a printer cable, a network cable and a video monitor cable 14C. The main housing 10 is pivotably connected to the base member 12, as will be described below in detail. A tray 16 of the docking station D is releasably connected to the base member 12. The tray 16 has three resilient wrap around corner holding members 16A, 16B and 16C to provide interference with the notepad computer 18. The upper left side of the tray 16 includes a resilient holding member 16D that allows a PCMCIA card C access to a PCMCIA slot 18A in the notepad computer 18 though prevents side movement of the notepad computer. The notepad computer 18 includes an expansion base connector (not shown) that is releasably electrically coupled and aligned with the expansion base or docking station connector 20 of the docking system when the notepad computer is received in the tray. The connector 20 is electrically coupled to the electronics E in the main housing, as is shown in FIG. 14.

As best shown in FIG. 1, the receiving tray 16 includes ejection levers 20A, 20B on both sides. The levers 20A and 20B are fixedly connected to cams 22A and 22B by a shaft 24A (shaft 24B not shown). Preferably, the lever, shaft and cam are fabricated as a monolithic unit.

Figure 3:
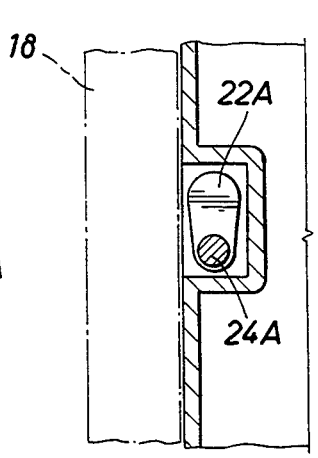
FIG. 3 is a section view taken along lines 3—3 of FIG. 2 with the cam shown in the retracted position.
Figure 4:
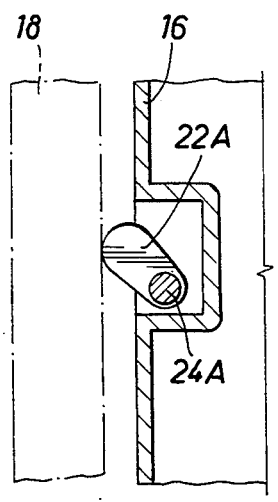
FIG. 4 is a view similar to FIG. 3 with the cam shown in the extended ejection position.

As best shown in FIGS. 3 and 4, when lever 20A is rotated back, as shown by the arrow in FIG. 1, the cam 22A is rotated from the retracted position (FIG. 3) to the extended position (FIG. 4) to eject the notepad computer 18 away from the base member 16.

Figure 5:
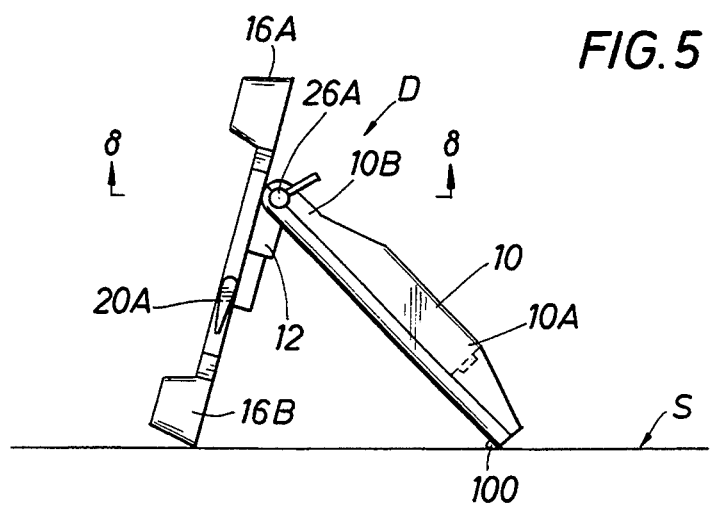
FIG. 5 is a side view of the preferred embodiment of the docking station showing the front pivot portion of the main housing spaced apart from the supporting surface and the rear portion engaging the supporting surface.

As shown in FIG. 5, the docking station D positions the tray 16 to receive the notepad computer 18 in an upright position with the rear portion 10A of the docking station in engagement with the supporting surface S. In the upright position, the front pivot portion 10B is spaced apart from the supporting surface S. The surface S can be any surface such as a table, desk, user's lap or any similar supporting surface.

Figure 8:
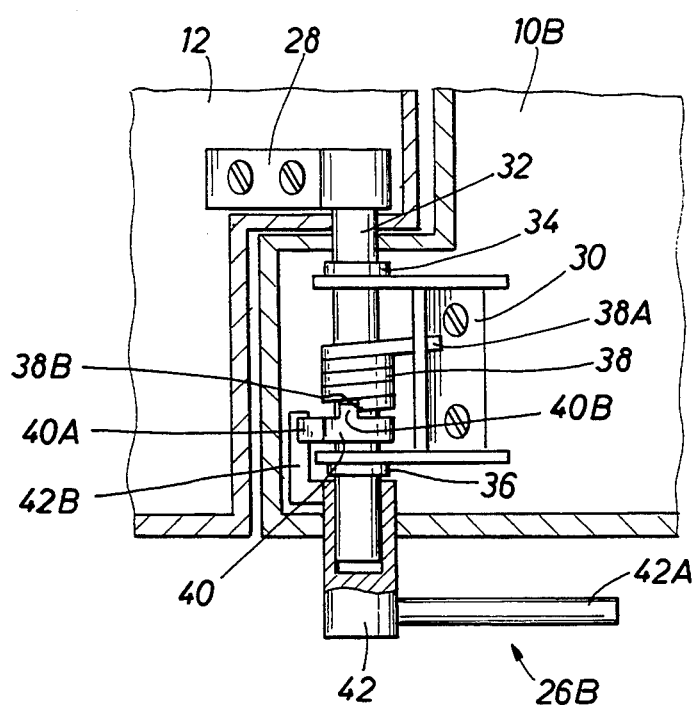
FIG. 8 is an enlarged section view of the preferred control means on the left side of the docking station taken along lines 8—8 of FIG. 5.

A preferred embodiment of the control means is one way clutch mechanisms 26A, 26B, as best shown in FIGS. 1 and 8, that are provided on each side of the docking station D. As best shown in the bottom view of FIG. 8, the one way clutch mechanism 26B on the left side of the tray 16 includes a bracket 28 that attaches the clutch mechanism 26B to the base member 12. Bracket 30 attaches the clutch mechanism 26B to the pivot portion 10B of the main housing 10. Any known fasteners, such as screws or rivets or similar fastening devices, can be used for attachment. The bracket 28 is fixed relative to shaft 32 and the bracket 30 is rotatably mounted about shaft 32 with bracket 30 preferably positioned between positioning rings 34 and 36. A coiled torque member 38 is received about the shaft 32 with one end 38A received in an opening in the bracket 30. The other end 38B of the coiled torque member 38 is positioned adjacent a release ring 40 that is positioned about the shaft 32. A release lever 42 having a pin 42A on one end and a slotted member 42B on the other end to engage and trap the release ring 40. Preferably, the lever 42 is removably positioned about one end of the shaft 32. Though the lever 42 is shown positioned on the shaft 32, since the lever is removable, it is not necessary that the lever be positioned on the shaft at all times. Two levers would be needed to simultaneously release both control means 26A, 26B.

Figure 6:
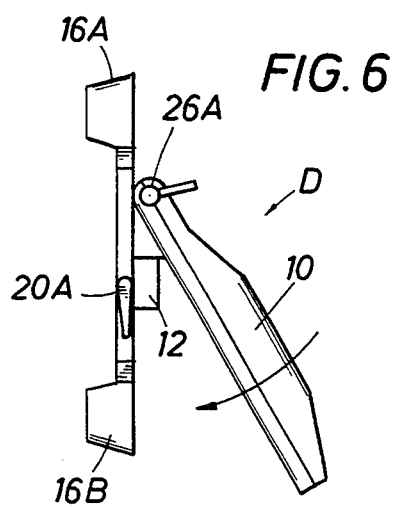
FIG. 6 is a view similar to FIG. 5 with the receiving tray and main housing pivoted towards the collapsed position.
Figure 7:
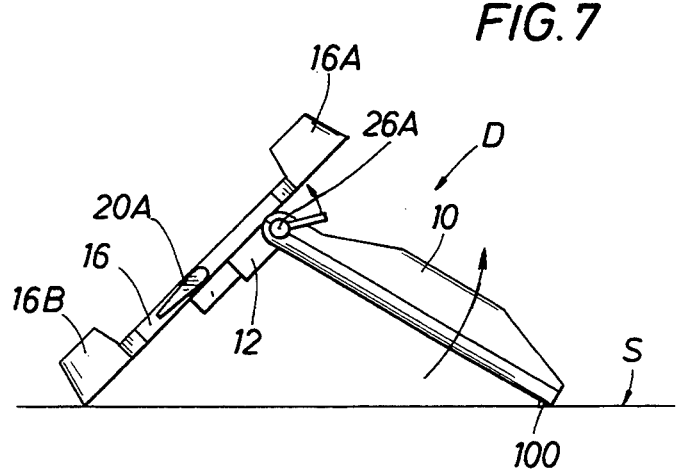
FIG. 7 is a view similar to FIG. 5 but with the receiving tray pivoted at a lower angle relative to the supporting surface.

The user of the docking station D can collapse or fold the main housing 10 with the base member 12 of the docking system from an upright to a collapsed position, as shown by the arrow in FIG. 6, or from a low angle position as shown in FIG. 12 to the upright position of FIG. 5 without using the release lever 42. However, to pivot the docking station the other direction (counter clockwise) so that the main housing is separated from the base member 12, the release lever 42 is positioned so that the key slot 42B is positioned about the radial projection 40A of the moving member 40 and the lever 26A is rotated as shown by the arrow in FIG. 7 to move the main housing 10 as shown by the arrow in FIG. 7. Moving of the lever 42 as shown in FIG. 7 forces the axial projection 40B of ring 40 to engage the end 38B of the coiled torque member 38 to allow free movement of the torque member 38 about the clutch shaft 32. Movement in the direction as shown in FIG. 7 without the lever 42 is prevented as the coiled torque member 38 wraps tighter about the shaft 32 to restrain pivoting. Therefore, this clutch mechanism prevents the docking station from inadvertently collapsing when in the upright position, such as due to forces imparted if the stylus 44 is used in this position, while allowing the docking station to be folded for storage or to the upright display position without the use of levers 42.

As shown in FIGS. 9–16, an alternative embodiment of the control means includes an actuator button 112, as will be discussed below, is provided to allow the base member 12' to pivot relative to the main housing 10'. As shown in FIGS. 9, 10 and 12, the notepad computer 18' with display L includes a stylus 44 used with the notepad computer 18'. As is known, the stylus 44 is used to write directly on the LCD display. An underlay captures the movement of the stylus and software of the computer converts the movement to commands, either by monitoring location when the computer is being used in a touch screen-like mode or by converting the movements into specific characters, which then form the command or data. Thus, there is no need for a keyboard with the notepad computer of FIGS. 1 and 9 since no information is typed into the notepad computer.

As can be seen in FIG. 12, the main housing 10' has both its rear portion 10A' and its front pivot portion 10B' in engagement with the surface S. In this low angle position, the notepad computer 18' and its LCD screen L are preferably 10° from the surface S. This low angle writing position of FIG. 12 provides a similar writing surface to that used with a conventional pen. In this low angle position, the docking station D' is generally used with an external monitor M connected by cable 14C to a video monitor connector to connector 70, as best shown in FIG. 13, in the rear of the main housing 10'.

Turning now to FIG. 11, a larger receiving tray 46 is releasably attached to the base 12' of the docking station D'. The tray 46 has a larger area than tray 16' but includes similar resilient holding members, as shown in FIGS. 1 and 9, to provide interference with the notepad computer 48. The expansion base connector 20' is removably positioned in the tray 46 to electrically couple the notepad computer 48 with the electronics E in the main housing 10'. While the notepad computer 48 includes an LCD screen, an optional conventional keyboard 50 supported by legs 52 (only one leg shown) provides input into the notepad computer 48. A cord 54 received in a connector in the front of the notepad computer 48 electrically couples the keyboard 50 to the notepad computer 48. The notepad computer 48 is in turn connected via the expansion base connector 20' to the electronics E in the main housing 10'. Though the notepad computer 48 is normally positioned as shown in FIG. 11 when used with a keyboard 50, the docking station could be positioned as shown in FIG. 12 for convenient pen input, storage, transportation or other purposes as previously discussed.

Figure 13:
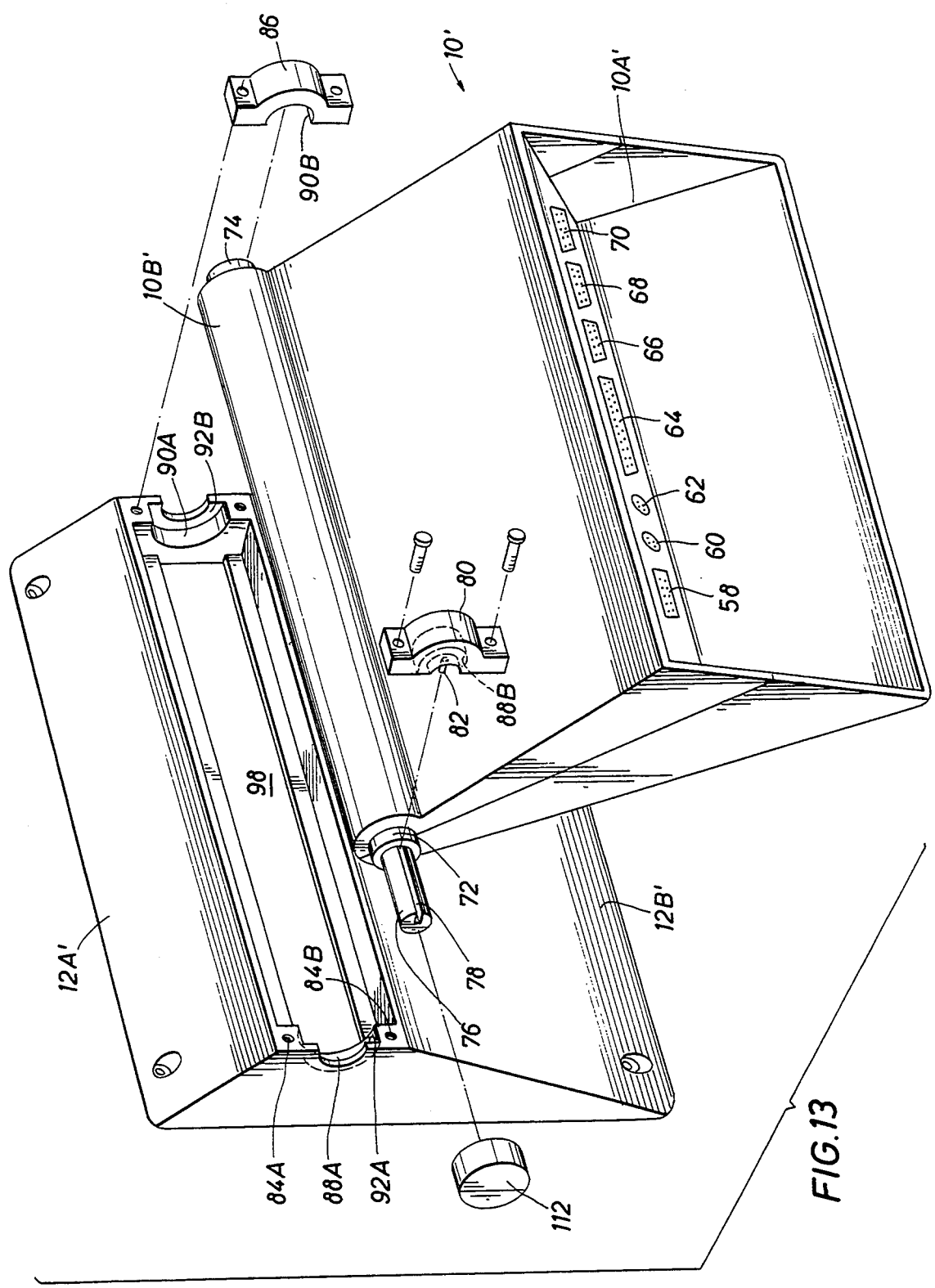
FIG. 13 is an exploded enlarged perspective view of the main housing and the base member of the docking station of FIG. 9.

Turning to FIG. 13, the rear portion 10A' of the main housing 10' of the docking station D' is better disclosed. The rear portion 10A' includes a number of connectors 58, 60, 62, 64, 66, 68 and 70 to receive mating connectors from peripheral devices. Examples of conventional connectors in a portable computer are disclosed in U.S. Pat. No. 5,199,888 that is assigned to the same assignee of the present invention and is incorporated herein by reference for all purposes. Preferably, the docking station D or D' would include seven connectors to receive mating connectors including, arranged from left to right, SCSI II connection for attachment of various peripherals, keyboard connector, mouse connector, parallel port connector, serial port connector, tape/floppy interface connector, and a VGA video connector, respectively connectors 58, 60, 62, 64, 66, 68 and 70.

At the front pivot end 10B' of the main housing 10', opposing cylindrical pivot members 72 and 74 are shown preferably integral with the main housing 10'. Extending from one side of the main housing 10' is pin means or pin 76 having a slot 78. A bracket 80 having a fixed dowel 82 is provided so that the dowel 82 is received in the slot 78 of pin 76. The bracket 80 is received about cylindrical pivot member 72, as best shown in FIGS. 13, 14 and 15, to facilitate pivoting of the main housing 10' relative to the base member 12'. After the dowel 82 is received in the slot 78, the bracket 80 is connected to the base member 12'. Fasteners are received through the holes in the bracket 80 and into holes 84A and 84B of the base member 12'. Similar to bracket 80 but without dowel 82, the bracket 86 is received about cylindrical pivot member 74 and uses fasteners received into the holes for attachment to the base member 12'. The cylindrical member 72 rides on surfaces 88A, 88B and cylindrical member 74 rides on surfaces 90A and 90B. Shoulders 92A and 92B on the base member 12' and brackets retain the main housing 10'.

An opening 94, as best shown in FIG. 14, allows a ribbon cable (not shown), connected to a header 96 connected to electronics E, to extend from the main housing 10' through the slot 98 in the base member 12', as best shown in FIG. 13. The end of the ribbon cable includes the expansion base connector 20 or 20' that is removably positioned in the trays. As can be seen in FIG. 13, holes are provided in the top end of the base member 12' and holes are provided in the bottom of the base member 12' to receive screws or conventional quick connect fasteners to releasably attach the receiving trays to the base member 12'.

Turning to FIG. 14, the main housing 10' is shown exploded into its lower section and upper section. The lower section spans the full length of the main housing 10'. Preferably, the rear portion of the lower section includes feet 100, as best shown in FIGS. 5 and 6, fabricated from a non-slip material such as SANTOPRENE rubber. As can be best seen in FIGS. 15 and 16, the lower section of the main housing 10' includes a toothed frusto-conical counterbore or blocking member 102 therein and a thrust plate 104. Preferably, the upper section of the main housing includes a corresponding toothed frusto-conical counterbore and thrust plate to counterbore 102 and thrust plate 104. Movable pin 106 includes a frusto-conical groove member 108 having a plurality of teeth positioned thereon. The grooved member 108 could be fabricated integral with the pin 106 but is preferably separate from but fixed relative to the pin 106. Urging means such as spring 110 is provided between the grooved member 108 and thrust plate 104 for urging the grooved member into blocking engagement with the main housing 10'. Actuator button 112 is received onto the axial movable pin 106 to disengage the grooved member 108 from the counterbore 102 of the main housing 10'.

The main housing is connected intermediate the top end and the bottom end of the base member for relative pivotal movement of the main housing to the base member. However, the preferred control means, as shown in FIG. 8, or the control means, as shown in FIGS. 14–16, allow a plurality of positions of the main housing to the base member. However, the preferred control means allows positioning in any position while the alternative control means is limited by the engagement of the teeth on grooved member 108. When actuator button 112 is pushed in, as shown by the arrow in FIG. 16, member 108 disengages from the counterbore 102 in the main housing 10' to allow docking station to be positioned relative to the main housing. Preferably, the notepad computer in the docking station is positioned between 10° and 85° from the surface S during use as described above.

The foregoing disclosure and description of the invention are illustrative and explanatory thereof, and various changes in the size, shape and materials, as well as the details of the illustrative construction may be made without departing from the spirit of the invention.

What is claimed is:

1. Apparatus adapted for use with a notepad computer having a display comprising:
   a main housing having a pivot portion and a rear portion;
   a base member having a top end and a bottom end;
   pivot member pivotably mounting said main housing with said base member, said main housing pivotable relative to said base member between a substantially upright position and a low angle position; and
   control means interengaged with said pivot portion of said main housing for controlling relative pivotable movement of said main housing to said base member wherein said control means comprises:
   a pin movably mounted with said main housing;
   a grooved member having a plurality of teeth attached to said movable pin;
   a blocking member attached to said main housing sized to receive one of said plurality of teeth;
   urging member urging said grooved member into blocking engagement with said blocking member to control positioning of said base member to said main housing;
   a bracket having a dowel attached to said base member,
   a slot in said pin, and
   said dowel moves relative to said slot to allow axial movement of said pin while limiting rotational movement of said pin to said bracket when the grooved member is in blocking engagement with the blocking member.

2. Apparatus of claim 1 further comprising
   a first tray releasably attached to said base member for releasably positioning the notepad computer with said tray so that the computer display is visible and accessible.

3. Apparatus of claim 2 further comprising
   an electronic circuit board disposed inside said main housing and containing electronic circuitry;
   an expansion base connector
   said tray removably positioned with said connector, and said connector being coupled to said electronic circuit board.

4. Apparatus of claim 2 for use with a second notepad computer of a different configuration than the first notepad computer, the apparatus further comprising
   a second tray releasably attached to said base member when said first tray is removed from said base member, said second tray for releasably positioning the second notepad computer.

5. Apparatus of claim 1 wherein said control means further comprises
   a thrust plate disposed in said main housing,
   said urging member positioned between said thrust plate and said grooved member.

6. Apparatus of claim 1 wherein said control means comprises
   a disengagement means for disengaging said blocking member relative to said grooved member to allow movement of the computer display relative to said main housing.

7. Apparatus of claim 1 for use on an operating surface wherein said main housing is pivotable relative to said base member when said apparatus is positioned on the operating surface.

8. A computer docking station adapted for use with first and second notepad computers having displays comprising:
   a main housing having a pivot portion and a rear portion;
   a base member interengaged with said pivot portion having a top end and a bottom end;
   an expansion base connector extending from said base member;
   a first tray having an opening, said first tray opening being releasably positioned about said connector; and
   a second tray having an opening and having a larger area than said first tray, said second tray opening being releasably positioned about said connector when said first tray is removed from about said connector.

9. The computer docking station of claim 8 further comprising
   an electronic circuit board in said main housing; and
   said expansion base connector coupled to said electronic circuit board.

10. A docking station for use on a supporting surface and for use with a notepad computer comprising:
    a main housing having a front pivot portion and a rear portion;
    a base member having a top end and a bottom end; and
    pivot member pivotably mounting said pivot portion of said main housing intermediate said top end and said bottom end of said base member, said main housing pivotable relative to said base member between an upright position and a low angle position, in said low angle position said main housing front pivot portion and said rear portion are engaging the supporting surface but in all other positions including the upright position said front pivot portion of the main housing is spaced apart from the supporting surface.

11. Docking station of claim 10 further comprising an electronic circuit board disposed inside said main housing and containing electronic circuitry; and a plurality of connectors coupled to said circuit board.

12. Docking station of claim 11 further comprising a power cable connected to one of said connectors.

13. Docking station of claim 10 for use with a notepad computer further comprising a first tray releasably positioned with said base member
   for releasably positioning the notepad computer.

14. Docking station of claim 13 further comprising
   an electronic circuit board in said main housing;
   an expansion base connector;
   said first tray removably positioned with said connector, and said connector being coupled to said electronic circuit board.

15. Docking station of claim 13 further comprising a second tray releasably attached to said base member when said first tray is removed from said base member.

16. Docking station of claim 10 further comprising
a pin movably mounted with said main housing;
a grooved member having a plurality of grooves attached to said movable pin;
a blocking member positioned with said main housing sized to be received in one of said plurality of grooves; and
urging members urging said grooved member into blocking engagement with said blocking member to control positioning of said display to said main housing.

17. Docking station of claim 10 wherein said main housing is pivotable relative to said base member to provide positioning of the computer relative to the supporting surface.
urging member urging said grooved member into blocking engagement with said blocking member to control positioning of said display to said main housing.

18. A docking station for use on a supporting surface and for use with a notepad computer comprising:
a main housing having a front pivot portion and a rear portion;
an electronic circuit board disposed inside said main housing and containing electronic circuitry;
a first tray having a top end and a bottom end for releasably positioning the notepad computer; and
a pivot member pivotably mounting said pivot portion of said main housing intermediate said top end and said bottom end of said first tray, said main housing pivotable relative to said first tray between an upright position and a low angle position.

19. Docking station of claim 18 for use with a notepad computer further comprising:
a base member; and
said first tray releasably positioned with said base member.

20. Docking station or claim 19 further comprising:
an expansion base connector;
said first tray removably positioned with said connector, and said connector being coupled to said electronic circuit board.

* * * * *

UNITED STATES PATENT AND TRADEMARK OFFICE
CERTIFICATE OF CORRECTION

PATENT NO. : 5,436,792
DATED : JULY 25, 1995
INVENTOR(S) : MICHAEL V. LEMAN ET AL.

It is certified that error appears in the above-identified patent and that said Letters Patent is hereby corrected as shown below:

In col. 7, line 53, after "connector" insert --;--.

In col. 8, line 16, after "portion" insert --and--.

In col. 9, line 12, please replace "members" with --member--.

In col. 9, lines 20-23, please delete "urging member urging said grooved member into blocking engagement with said blocking member to control positioning of said display to said main housing.".

In col. 10, line 19, please replace "or" with --of--.

Signed and Sealed this

Tenth Day of October, 1995

Attest:

BRUCE LEHMAN

Attesting Officer

Commissioner of Patents and Trademarks